March 19, 1946.   C. T. STORM ET AL   2,396,757
MOTOR VEHICLE INDENTIFICATION TAG HOLDER
Filed Aug. 14, 1944   2 Sheets-Sheet 1
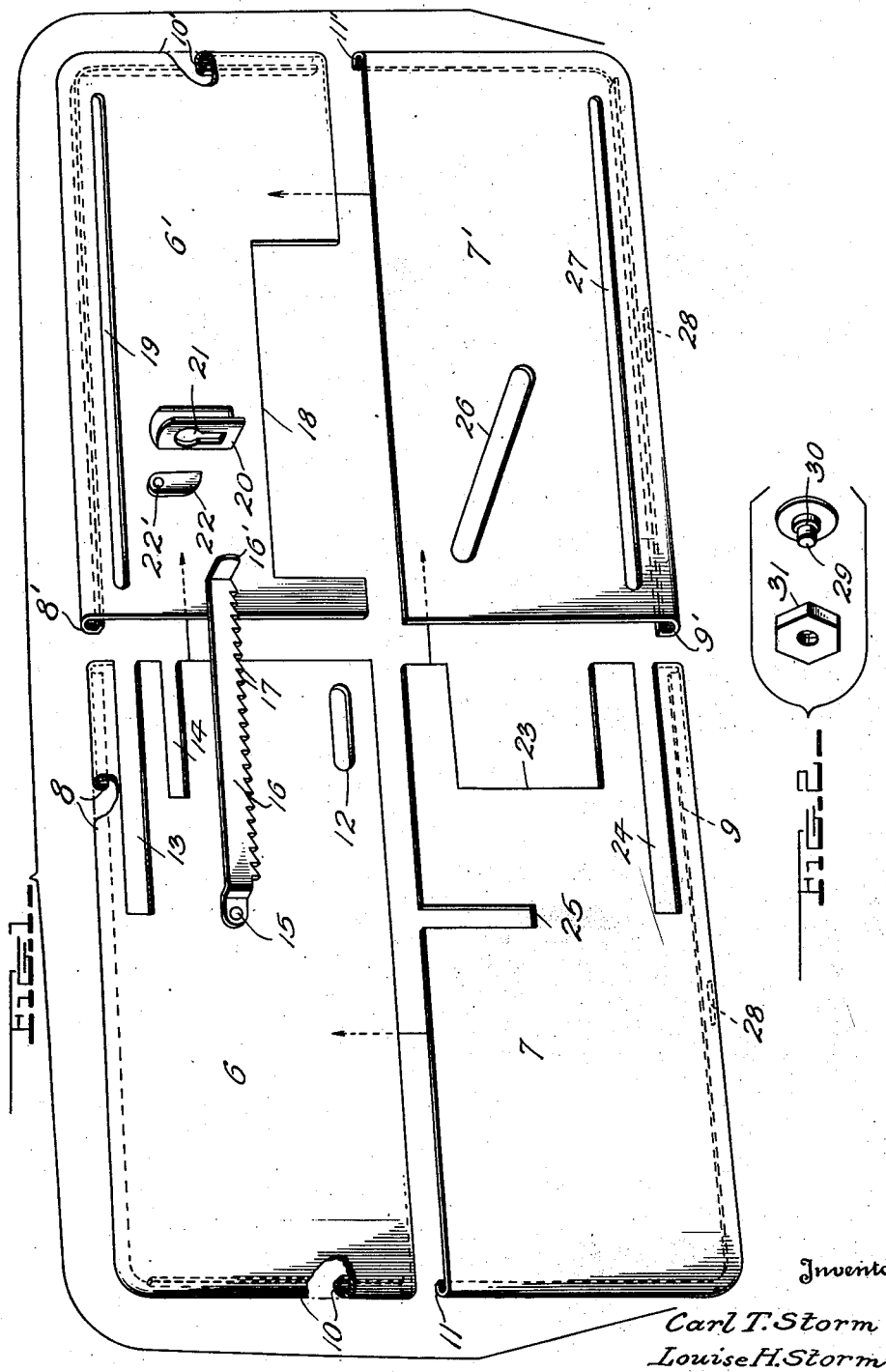
Inventors
Carl T. Storm
Louise H. Storm

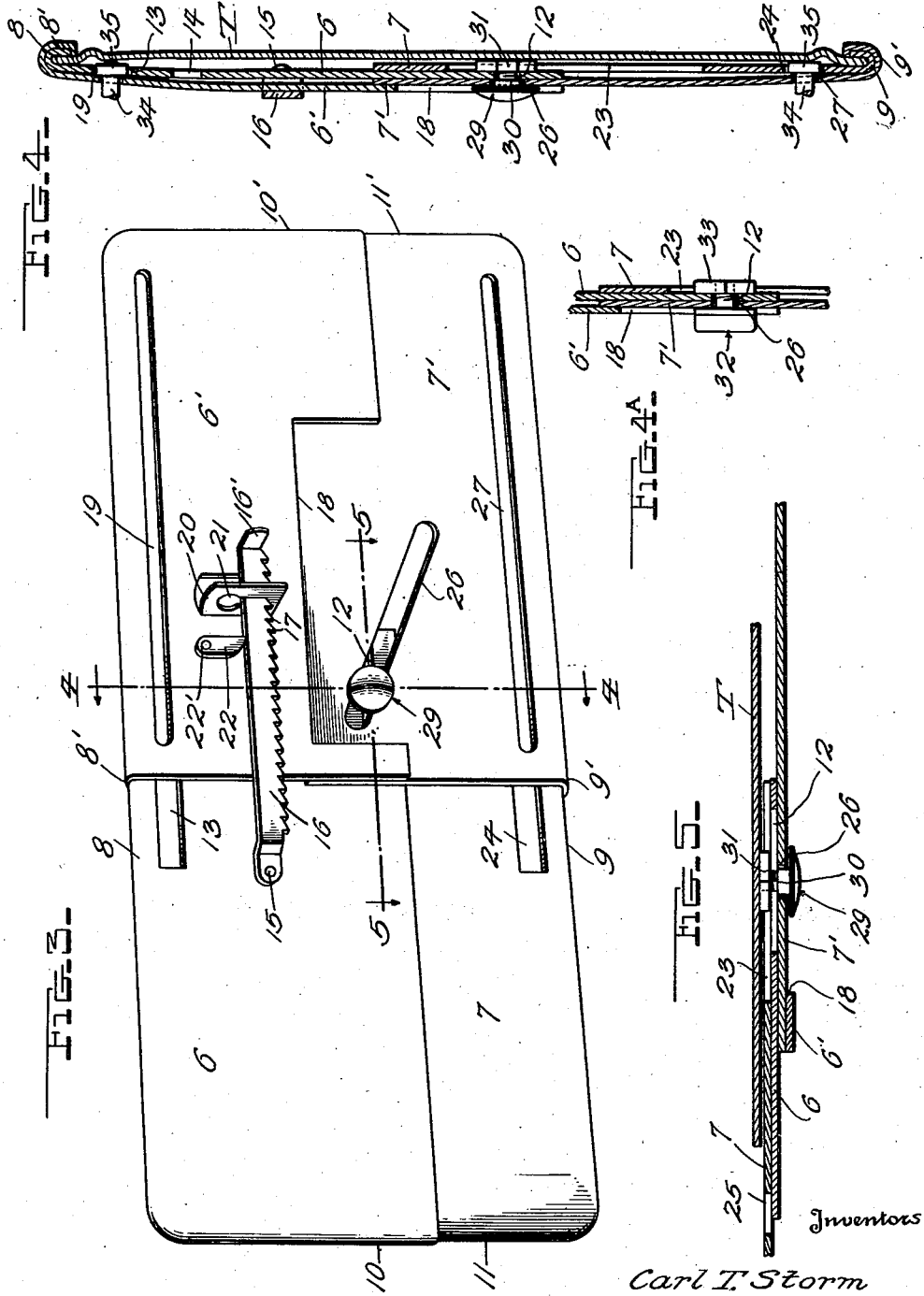

Patented Mar. 19, 1946

2,396,757

UNITED STATES PATENT OFFICE 2,396,757

MOTOR VEHICLE IDENTIFICATION TAG HOLDER

Carl T. Storm and Louise H. Storm, Detroit, Mich.

Application August 14, 1944, Serial No. 549,324

4 Claims. (Cl. 40—125)

The invention relates to a novel holder for a motor vehicle identification plate or tag, and to prevent confusion with various plates embodied in the construction, of the holder, said identification plate or tag will be hereinafter referred to only as a tag.

One object of the invention is to provide an unusually simple and inexpensive holder which permits quick and easy removal of one tag and re-clamping of the same tag after attachment of a tab or plate bearing the number of the year, or clamping of a new tag.

Another object is to make novel and effective provision for varying the relation of length to height of the holder according to the proportions of the tag to be clamped.

A still further object is to provide a novel structure for locking the holder in tag-clamping position to prevent unauthorized changing of tags.

With the foregoing in view, the invention resides in the novel subject matter hereinafter described and claimed, description being accomplished by reference to the accompanying drawings.

Figure 1 is a disassembled perspective view partly broken away and in section, showing the four plates and their hook flanges, and the means which permits locking of the holder in tag-holding position.

Fig. 2 is a perspective view of the bolt and nut used in operatively connecting the plates.

Fig. 3 is a perspective view of the assembled holder.

Figs. 4 and 5 are enlarged sectional views on lines 4—4 and 5—5 of Fig. 3.

Fig. 4ᵃ is a detail section similar to a portion of Fig. 4, showing a slight modification.

In the drawings above briefly described, preferred features of construction have been shown, and while they will be rather specifically described, it is to be understood that variations may be made within the scope of the invention as claimed.

The numerals 6 and 6' denote two rectangular upper plates, and 7 and 7' refer to two similar lower plates. The upper edges of the plates 6 and 6' are provided with hook flanges 8 and 8' which telescope when said plates 6 and 6' are overlapped, and the lower edges of the plates 7 and 7' are also formed with hook flanges 9 and 9' to telescope when these two plates are overlapped. The outer ends of the plates 6 and 6' have hook flanges 10 and 10', and the outer ends of the lower plates 7 and 7' are formed with hook flanges 11 and 11' to telescope with said flanges 10 and 10' when said lower plates 7 and 7' are slidably overlapped with said upper plates 6 and 6'.

The plate 6 is formed with a horizontal slot 12 near its inner lower corner, and toward its upper edge has other horizontal slots 13 and 14 which open through its inner end. Pivoted at 15 to this plate, is a horizontal bar 16 having teeth 17 its full length.

The plate 6' has a large notch 18 in its lower edge, and a horizontal slot 19 near its upper edge. This plate 6' is provided with a lateral lug 20 having an opening 21, and near this lug a dog 22 is pivoted to said plate, at 22'.

The plate 7 is formed with a large notch 23 in its inner end, and with a horizontal slot 24 below said notch and opening through the inner edge of the plate. A vertical slot 25 is also formed in and opens through the upper edge of this plate 7.

Plate 7' has an inclined cam slot 26 formed therein, and near the lower edge of this plate there is also a horizontal slot 27. This plate 7' and the other plate 7 preferably have water drainage openings 28 in their hook flanges 9' and 9.

When the four plates 6, 6', 7 and 7' are assembled, their hook flanges will telescope and said plates will slidably overlap as seen in Figs. 3, 4 and 5. The bar 16 will extend through the opening 21 in the lug 20; the slot 14 will accommodate one end of the dog pivot 22' which may be considered as a rivet; and the slots 13 and 19 will register with each other. Also the slot 26 will cross the slot 12; the slots 24 and 27 will register with each other, and the slot 25 will accommodate one end of the bar pivot 15 which may be considered as a rivet. A shouldered bolt 29 is passed through both slots 12 and 26 and while freely slidable in both, is preferably held in the slot 12 by clamping the plate 6 between the bolt shoulder 30 and the nut 31 of the bolt. By loosening the nut, however, the bolt may be adjusted longitudinally of the slot 12.

The holder is contracted to cause its hook flanges to embrace the edges of the tag T, by simply pulling on handle 16' or by pushing inwardly on the outer ends of the plates 6, 6', 7 and 7', the dog 22 being first swung up away from the bar 16. As the plates are thus slid inwardly, the bolt 29 and cam slot 26 cooperate to effect the necessary relative vertical sliding of the plates. Whenever it is necessary to change the relation of length to height of the holder according to the proportions of the tag to be clamped, this may be accomplished by adjusting the bolt 29 longitudinally of the slot 12.

The teeth 17 of the bar 16 are engageable with the lower end of the opening 21 to hold the plates against outward creeping and the dog 22, when swung down, will hold said teeth against accidental disengagement. If desired, the shackle of an ordinary padlock may be passed through the opening 21 over the bar 16 to lock it in operative position. The free end of this bar may well be bent laterally, to form a handle 16' by means of which said bar may be readily operated.

If desired (see Fig. 4a), a thumb screw 32 instead of the shouldered bolt 29, may extend through the slots 12 and 26 and engage a nut 33. Tightening of this thumb screw after relative adjustment of the plates will hold them in tag-clamping position. The bar 16, dog 22 and lug 20 may, therefore, be dispensed with, if desired, but may well be retained as an extra precaution and to permit locking of the holder.

Suitable bolts 34 (Fig. 4) may be passed through slots 19 and 27 to mount the holder on the usual bracket and the nuts 35 of these bolts will be received in the slots 13 and 24.

From the foregoing, it will be seen that a novel and advantageous provision has been disclosed for attaining the desired ends, but attention is again invited to the possibility of making variations.

We claim:

1. A license tag holder comprising two slidably overlapped upper plates having telescoped hook flanges at their upper edges to engage the upper edge of the tag, two slidably overlapped lower plates having telescoped hook flanges at their lower edges to engage the lower edge of the tag, said lower plates being slidably overlapped with said upper plates, the outer ends of said upper plates and the outer ends of said lower plates having telescoped hook flanges to engage the ends of the tag, one of said plates having an inclined cam slot, the diagonally opposite plate having a horizontal slot which crosses said inclined cam slot, a bolt extending through both of said slots and cooperable with said cam slot to relatively slide said upper and lower plates vertically when said plates are relatively slid inwardly, and a nut on said bolt, the relation of length to width of the holder being variable by adjusting said bolt longitudinally of said horizontal slot.

2. A license tag holder comprising two slidably overlapped upper plates having telescoped hook flanges at their upper edges to engage the upper edge of the tag, two slidably overlapped lower plates having telescoped hook flanges at their lower edges to engage the lower edge of the tag, said lower plates being slidably overlapped with said upper plates, the outer ends of said upper plates and the outer ends of said lower plates having telescoped hook flanges to engage the ends of the tag, means operable by relative horizontal sliding of said plates for relatively sliding them vertically, and means for holding said plates against relative outward horizontal sliding after engagement with the tag, said means comprising a toothed bar pivoted to one of said plates and a lug on another of said plates having an opening through which said bar extends, said teeth being engageable with one end of said opening, the other end of said opening being sufficiently large to receive a padlock shackle to lock said bar in operative position.

3. A license tag holder comprising two slidably overlapped upper plates having telescoped hook flanges at their upper edges to engage the upper edge of the tag, two slidably overlapped lower plates having telescoped hook flanges at their lower edges to engage the lower edge of the tag, said lower plates being slidably overlapped with said upper plates, the outer ends of said upper plates and the outer ends of said lower plates having telescoped hook flanges to engage the ends of the tag, one of said plates being formed with an inclined cam slot, the plate diagonally opposite said one plate being in contact with it and formed with a horizontal slot positioned to intersect said cam slot, the two remaining plates being recessed adjacent the slotted areas of said diagonally opposite plates, a headed and shouldered bolt passed through said intersecting slots, a nut on the threaded end of the bolt to clamp the plate having said horizontal slot against the shoulder on said bolt, and means for locking the several plates against relative movement after their hook flanges have been engaged with the edges of a license tag.

4. A license tag holder comprising two slidably overlapped upper plates having telescoped hook flanges at their upper edges to engage the upper edge of the tag, two slidably overlapped lower plates having telescoped hook flanges at their lower edges to engage the lower edge of the tag, said lower plates being slidably overlapped with said upper plates, the outer ends of said upper plates and the outer ends of said lower plates having telescoped hook flanges to engage the ends of the tag, the four plates being substantially rectangular in shape and having their inner corner portions in overlapping relation, one of said plates having an inclined cam slot in its inner corner portion, the plate diagonally opposite said one plate being in contact with it and having an opening to register with said slot, the other two diagonally opposite plates having recesses in areas adjacent said slot and said opening, and a clamping bolt passed through said slot and said opening to hold said contacting plates against relative movement.

CARL T. STORM.
LOUISE H. STORM.